(12) United States Patent
Landreth

(10) Patent No.: US 11,034,261 B2
(45) Date of Patent: Jun. 15, 2021

(54) OFF-GRID, UTILITY-SCALE POWER TRANSMISSION SYSTEM VIA TRAIN

(71) Applicant: Edward Wade Landreth, Albuquerque, NM (US)

(72) Inventor: Edward Wade Landreth, Albuquerque, NM (US)

( * ) Notice: Subject to any disclaimer, the term of this patent is extended or adjusted under 35 U.S.C. 154(b) by 481 days.

(21) Appl. No.: 16/003,065

(22) Filed: Jun. 7, 2018

(65) Prior Publication Data

US 2019/0152344 A1 May 23, 2019

Related U.S. Application Data

(60) Provisional application No. 62/590,265, filed on Nov. 22, 2017.

(51) Int. Cl.
| | |
|---|---|
| H01M 4/02 | (2006.01) |
| B60M 3/06 | (2006.01) |
| B60M 1/13 | (2006.01) |
| B60M 1/30 | (2006.01) |
| B60L 5/39 | (2006.01) |
| B60L 5/18 | (2006.01) |
| B60L 1/00 | (2006.01) |
| H01M 10/42 | (2006.01) |
| B60L 50/90 | (2019.01) |
| H02J 7/00 | (2006.01) |
| H02J 7/02 | (2016.01) |

(52) U.S. Cl.
CPC ............. *B60M 3/06* (2013.01); *B60L 1/00* (2013.01); *B60L 5/18* (2013.01); *B60L 5/39* (2013.01); *B60L 50/90* (2019.02); *B60M 1/13* (2013.01); *B60M 1/30* (2013.01); *H01M 10/425* (2013.01); *H02J 7/00* (2013.01); *H02J 7/0022* (2013.01); *H02J 7/0045* (2013.01); *H02J 7/0068* (2013.01); *H02J 7/022* (2013.01); *B60L 2200/30* (2013.01); *H01M 2010/4271* (2013.01); *H01M 2220/10* (2013.01)

(58) Field of Classification Search
None
See application file for complete search history.

(56) References Cited

U.S. PATENT DOCUMENTS

| | | | | |
|---|---|---|---|---|
| 2005/0279242 | A1* | 12/2005 | Maier | B60L 50/66 105/26.05 |
| 2011/0315043 | A1* | 12/2011 | Kumar | B60L 9/28 105/35 |
| 2013/0317674 | A1* | 11/2013 | Arai | B61C 17/12 701/19 |
| 2014/0295218 | A1* | 10/2014 | Hakansson | H01M 10/48 429/50 |
| 2016/0229434 | A1* | 8/2016 | Brousseau | G01S 19/14 |
| 2016/0344070 | A1* | 11/2016 | Chujo | B60L 3/0069 |

* cited by examiner

*Primary Examiner* — Jacob B Marks
(74) *Attorney, Agent, or Firm* — Alexander Chen, Esq.

(57) ABSTRACT

A Power transmission system for transmission of electrical energy comprising a battery unit and a form of transportation to transport said battery unit wherein the transportation is comprised of a plurality of train cars carrying said battery unit and at least one rail track system to which the railcars travel on and further where the railcars are comprised of plurality of battery modules which are comprised of plurality of battery packs which are comprised of plurality of battery cells and a battery pack management system.

1 Claim, 7 Drawing Sheets

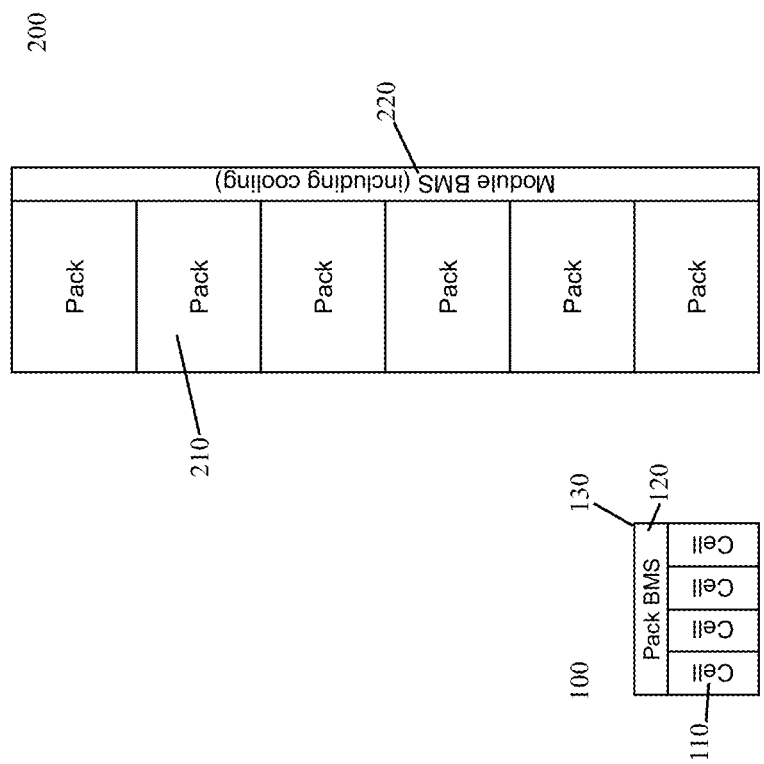

OFF-GRID, UTILITY-SCALE POWER TRANSMISSION SYSTEM VIA TRAIN

INCORPORATION BY REFERENCE

This application claims the benefit of priority under 35 USC 119(e) to the filing date of U.S. provisional patent application No. 62/590,265, titled "Method Off-Grid, Utility-scale Power Transmission System via Train," which was filed on Nov. 22, 2017, and which is incorporated herein by reference in its entirety.

FIELD OF THE INVENTION

The present invention generally relates to large-scale energy storage systems, and more specifically to an electrochemical, large-scale energy storage to be transportable primarily by train, but modular such that all modes of transportation including by rail, truck, barge, ship and plane are considered and accommodated.

BACKGROUND OF THE INVENTION

Electrical power is generated via a variety of sources. Methods include traditional fossil fuels (coal and natural gas) and green energy sources (solar, wind, hydro, etc.). A substantial requirement in electrical generation is the transmission of this electricity from producers to the final consumer.

Traditionally, this transmission is done primarily through the use of either the overhead power line and poles that populate the visual scape. Alternatively, powerlines are buried. In either mode, a continuous physical connection by wire must be installed and maintained.

As a general principle to electrical-thermodynamics the transmission of electrical power through conductors over long distances results in losses. As a practical matter, the modern electrical grid remains stagnant and is rife with inefficiencies.

Energy is lost from the "joule effect" in power transmission lines of the electrical grid. That is that energy is lost due to impedance of the conductors, which comprise the transmission lines, and the generated heat escapes to the surrounding environment. Further, this "joule effect" is compounded by the physical distance that the energy is to travel. The overall losses between the power plant and end consumers may be as high 8% to 15% depending on the utility grid and transmission distance. As a consequence, the modern power grid is always leaking harvested or manufactured energy that it is trying to transport from one place to another.

Recently, we have seen green energy sources and power plants such as photovoltaic solar fields or wind turbines that can be built with a variety of sizes and capacities, and, thus, can be built locally, and, thus, eliminate the transmission cost and the "joule effect". However, these power sources still depend on nature and thus are inherently intermittent or physically limited if they are designed without additional electricity storage facilities. For examples, a photovoltaic solar field does not generate electricity at night and a wind turbine will remain idle on a calm day without winds. For these reasons, green energy sources without additional electricity storage facilities cannot meet some mission critical power demands that would require 24/7 electricity. Although this can be somewhat solved in that a simple solution is to then design these energy systems with the aforementioned additional electrical storage abilities, the systems however then often cumulatively reach a volume and weight such that any stored energy now becomes restricted to the area, and a transmission of the stored energy again suffers the loss due to "joule effect" for any use that is not local to the system.

Furthermore, as green energy technology continues to improve with increases in efficiency, green energy sources are now occasionally producing excess energy, past what the demand is upon the system. Some power plants choose to turn off the power generators when the plants reach their max capacities instead of running the generators continuously. However, this practice involves some inherent costs in that there remains the issue of mechanical and electrical system degradation that comes with stopping and later starting the system again. The power plants that choose to avoid this issue and instead run the generators continuously in the alternative will typically take the excess electricity power harnessed and wastefully dump it to the ground.

Some existing large-scale, grid energy power plants and green energy facilities attempt to address this inefficiency by providing a method to store excess energy produced during low demand and return it to the grid during peak demand. Such a method, in effect, balances production and demand making the overall electrical generation process more efficient. However, these energy storage methods do little to improve the efficiency of power transmission.

Therefore, one would naturally desire a new electricity storage and transmission system that is energy efficient but additionally is mobile, and, thus, eliminates the waste of the "joule effect." An electrical storage, off-grid, utility-scalable, power transmission system will both balance electrical production and demand while increasing power transmission efficiency via an alternative transmission method thus avoiding the typical grid loss.

Further, by creating a mobile and deployable high capacity storage and transmission system, energy could be brought to places that are remote, off-grid, recovering from catastrophe, or problematic or expensive to power by the traditional model of power transmission.

Another hidden cost and consideration a wired power plant or green energy facility will face is the considerable expense in obtaining the numerous real estate easements being granted to allow construction, costing both time and money. Further adding to this is the cost in the physical installation and maintenance of mile upon mile of wire.

By creating a mobile and deployable high capacity storage and transmission system, a power plant or green energy facility can avoid these costs associated with expanding to new areas, and now offer delivery to areas which would not be considered cost-effective under the previous economic model. Further, with the issue of physical infrastructure no longer an issue, the high capacity storage and transmission system can be immediately deployed and put to use, only limited by the amount of time it takes to physical deliver the system itself.

Further, a traditional model power plant or green energy facility, with the ability to now meet the reserve obligations of the power plant with a deployable scalable storage medium, can increase the power generation capacity and maximize a more efficient energy output, which in turn maximizes the ultimate load capacity of the power facility. The final result of such a system is a far more cost-effective power generation facility, which operates at higher production, able to store its excess to reserves, and left with the ability to service more customers.

OBJECT OF THE INVENTION

Accordingly, it is an object of this invention to provide a chemical, large-scale, rechargeable, and mobile battery system.

It is an object of the invention to provide a chemical, large-scale, rechargeable, and mobile battery system that equipped with a charging and discharging system comprising a pantograph affixed to the mobile platform, with a catenary system and or third rail.

It is an object of the invention to provide a charging and discharging system that allows the charge independent of power source type (fossil, solar, wind, hydro, etc.) or power condition (AC vs DC, voltage, current).

It is an object of the invention to provide a mobile battery system that leverages the existing rail infrastructure to deliver the mobile batter system to the consumer destination.

It is an object of the invention that in addition to transport by rail infrastructure, other modes of transportation are, in concert, utilized such that transportation costs are balanced for costs, speed, and efficiency.

It is an object of the invention to provide a mobile battery system that eliminates the "joule effect."

It is an object of the invention to provide a mobile battery system that can be customized to any desired capacity and may be linked together for increased energy storage and power availability.

It is an object of the invention to provide a mobile battery system that is standalone and self-contained with all desired functions of a power source.

It is an object of the invention to provide a mobile battery system that can be configurable to discharge in parallel or in series, and, thus, reduces charging time or capable of providing higher power during discharge.

It is an object of the invention to provide a mobile battery system that can be detached from the mobile platform and left at consumer site allowing for an off-grid power source.

It is an object of the invention to provide a mobile battery system that can be disposed into a custom transportainer that can be loaded and unloaded to a mobile platform.

It is an object of the invention to provide a mobile battery system that comprises an external panel enclosure for the standard connections for commercial plug types ranging from 20 volts to 690 volts and or an electrical panel enclosure allowing for the hard wiring of connections for optional local power delivery by the consumer connecting directly into the exterior of the mobile battery system.

It is an object of the invention to provide a mobile battery system that can be operated, and the generated power may be transmitted and consumed without ever interfacing with the existing power grid, and, therefore, without being subjected to oversight, monitoring, and regulation.

It is an object of the invention to provide a mobile battery system that self-tracks the electricity generated, transmitted, and distributed.

It is an object of the invention to provide a mobile battery system that is certifiable green energy source.

SUMMARY OF INVENTION

A power transmission system for transmission of electrical energy is disclosed comprising a battery unit and a form of transportation to transport the battery unit. The transportation is comprised of a plurality of train cars carrying the battery unit and at least one rail track system to which the railcars travel on. The battery unit is comprised of plurality of battery modules. The battery module is comprised of plurality of battery packs. The battery packs is comprised of plurality of battery cells. The battery pack is comprised of a battery pack management system. Similarly, the battery module is further comprised of a battery module management system. The train car is comprised of a battery unit, a fire suppression system, a power conditioning system, a rectifier, an inverter, a transformer, a system controller.

In one embodiment, the train car comprises a portable container that houses the battery unit, the fire suppression system, the power conditioning system, the rectifier, the inverter, the transformer, and the system controller.

In another embodiment, the portable container is detachable from the train car.

In yet another embodiment, the train car further comprises of an alternator or a motion type charging system installed on each train car and connected to the train car axle.

In yet another embodiment, the train car further comprises an electrical extension connection apparatus that comprises a pantograph.

In yet another embodiment, the mobile battery system comprises an electrically charged track or third rail.

In yet another embodiment, the train car is comprised of an undercarriage electrical connection apparatus that draws electricity from the charged track to charge the battery unit.

The train car system is further comprised of a management platform hosted by a computer. The platform is comprised of a master controller module that controls the operation of the system controller.

In one embodiment, the master controller module manages the system controller by wireless communication.

The system controller controls the transformer, inverter, rectifier, power conditioning system, and fire supersession system.

BRIEF DESCRIPTION OF THE DRAWINGS

These and other features and advantages of the invention will not be described with reference to the drawings of certain preferred embodiments, which are intended to illustrate and not to limit the invention, and in which FIG. 1 illustrates an embodiment of the current invention's battery pack.

FIG. 2 illustrates an embodiment of the current invention's battery module.

DETAILED DESCRIPTION OF THE INVENTION

Figure 3A:
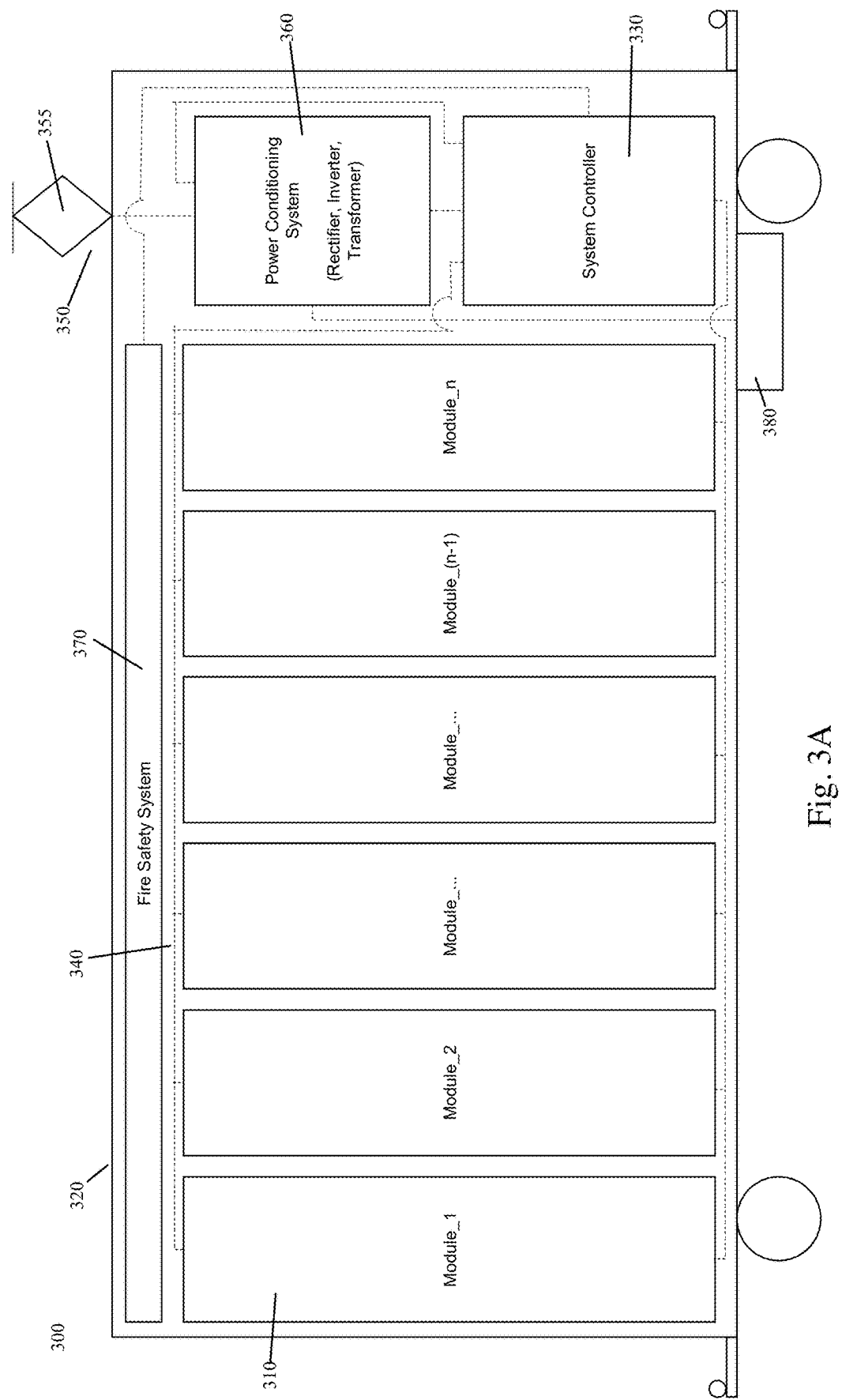
FIG. 3A illustrates an embodiment of the current invention's system assembled on a mobile platform.

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

Referring to FIG. 1, an exemplary embodiment 100 of the current invention's battery pack is shown. Individual, rechargeable, electrochemical battery cells 110 are electrically joined to each other via a mechanical attachment of a conductor. It is appreciated that a variety of conductors, conductor materials, and attachment methods can be employed. Battery cells 110 are joined in a series circuit to reach a nominal voltage, or in a parallel circuit to reach a nominal capacity. The final configuration of these cells, of which many different variations exist based on design specifications, is a battery pack 100. Each battery pack 100 further comprises a protection circuitry, which in turn comprises fuses, diodes, etc., as part of a Battery Management System (BMS) 120. The battery pack BMS 120 monitors state of health (SOH) characteristic of each individual cell and at the pack level such as state of charge, depth of discharge, charge/discharge rates, temperatures, etc. The electrical subassembly (cells and BMS) is packaged in an enclosure 130 to provide mechanical integrity and isolation. This enclosure 130 comprises a connector to interface with the next level assembly. Pack BMS 120 is further monitoring and controlling the charging and discharging of individual cells, and sending real-time information back to a module level BMS that, in turn, processes the information, compiles it with its own intelligence, and sends the aggregate information to a master system controller.

Referring to FIG. 2, individual battery packs 210 are electrically joined to each other via connection to electrical bus-bars in a rack and stack system to form the exemplary battery module 200. Battery packs 210 are joined in a series circuit to reach a nominal voltage, or in a parallel circuit to reach a nominal capacity. Each battery pack within the module may be individually removed and replaced for any reason allowing for improved maintenance and safety. The final configuration of these battery packs, of which many different variations exist based on design specifications, forms a battery module 200. Each battery module further comprises protection circuitry, which in turn comprises fuses, diodes, etc., as part of a module level BMS 220. The purpose of the module BMS 220 is to monitor state of health (SOH) characteristic of each battery pack based on information from the pack level BMS. The Module BMS 220 is capable of individually controlling each battery pack 210. Further, individual battery packs 210 can be isolated based on information from the BMS. The module BMS compiles and sends intelligence to a master system controller to help manage the whole mobile battery storage system. Each battery module 200 may include an active cooling system to manage heat generation and regulate the temperature of the individual cells for optimal performance.

Figure 3B:
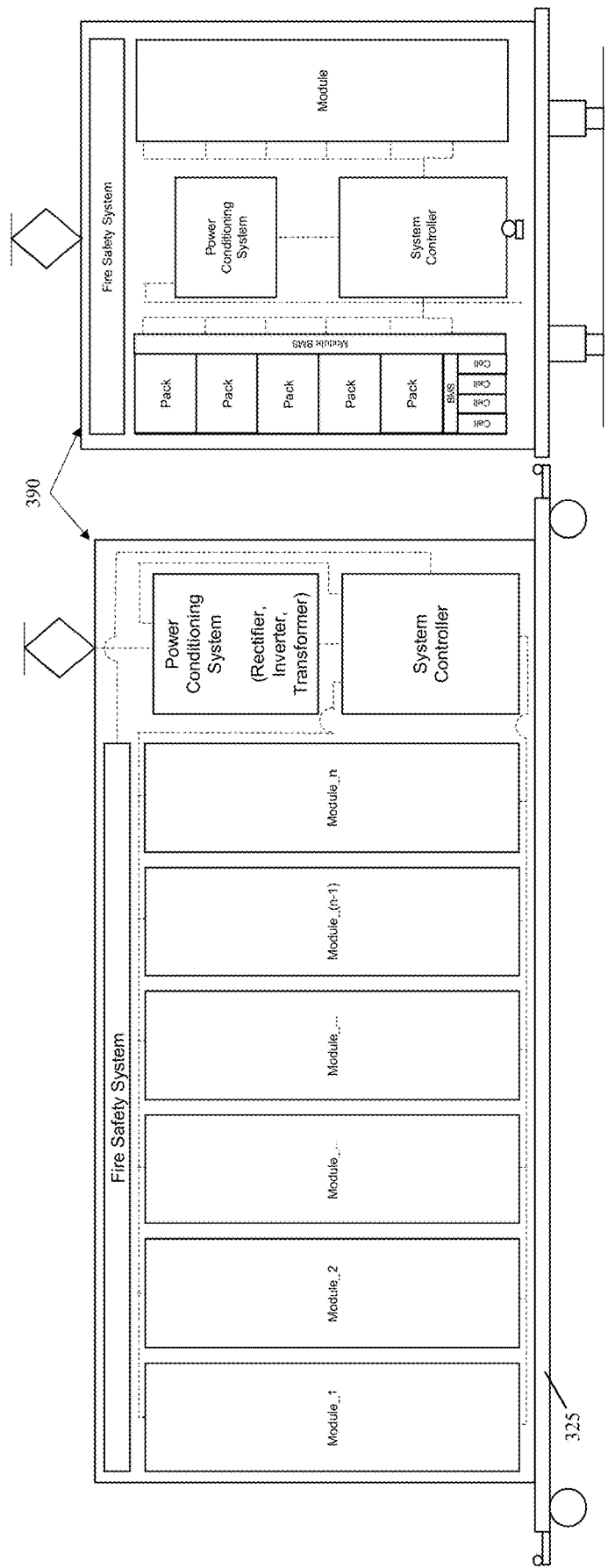
FIG. 3B illustrates an embodiment of the current invention's system assembled on a mobile platform with an alternative configuration.

Referring to FIG. 3A, an exemplary mobile battery storage system 300 is shown. In one embodiment, the mobile battery storage system 300 comprises multiple battery modules 310 that are configured into a custom train car 320 based on performance requirements and constraints, such as weight, volume, dimension, and other considerations. In another embodiment, a system controller 330 is built into the mobile battery storage system 300. All battery modules 310 are joined to each other via electrical bus-bars and conductors 340. The system controller 330 can be caused to configure the modules for a series circuit to reach a nominal voltage, or for a parallel circuit to reach a nominal capacity by the use of switches disposed in the system controller 330. It is appreciated that with the innovative system of bus-bars, conductors, wirings and switches, multiple electrical configurations can be configured to meet any required output voltage, current, and power. The system controller 330 interfaces, communicates with, and controls the operation of battery modules 310. In yet another embodiment, the mobile battery storage system 300 further comprises a pantograph 350 that provides an efficient and speedy plugging-in at a customer site. The pantograph 350, in turn, comprises a set of articulated arms affixed to the custom train car 320, and can be extended or retracted, and, as a result, extend or pull back the head 355 of the pantograph. It is appreciated that the pantograph head 355 can be extended and retracted using pneumatic or electrical power, and initiated automatically or manually. In another embodiment, the mobile battery storage system 300 further comprises a Power Conditioning System 360, and a Fire Suppression System 370. In yet another embodiment, the mobile battery storage system 300 further comprises a of an alternator or a motion type charging system installed on each train car 380. In another embodiment, referring to FIG. 3B, multiple battery modules 310 are configured into a custom transportainer 390 that can be loaded and unloaded to a custom rail car 320 or a flatbed rail car 325.

Figure 4:
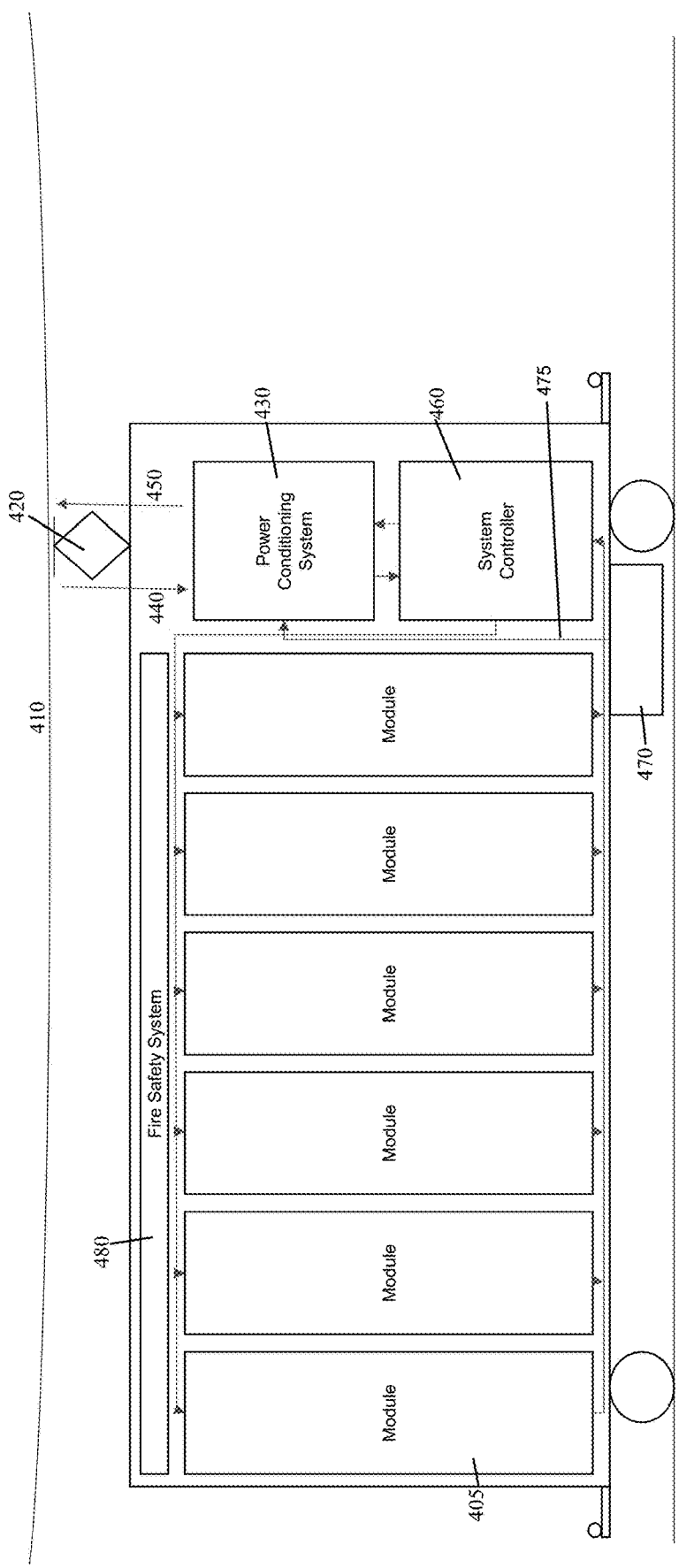
FIG. 4 illustrates an embodiment of the current invention, and shows the inner circuitry and power management of the system.

Referring to FIG. 4, an embodiment of the current invention's mobile battery storage system 400 in use at a local power grid is depicted. The local grid's conductor 410 is disposed overhead. In an extended position, the pantograph head 420 reaches out and makes contact with the conductor 410, and, thus, connects with the local power grid. In a retracted position, the pantograph head makes no contact with the conductor 410 or the local power grid.

Still referring to FIG. 4, a Power Conditioning System (PCS) 430 is depicted being integrated into the internal circuitry of each mobile storage system 400 to regulate incoming power from the pantograph 420 and outgoing power to the pantograph. Incoming power circuit 440 allows incoming power to enter the mobile battery system when it is being charged. In one embodiment, the incoming power is conditioned through a transformer disposed within the PCS 430 to transform voltage/current, and is rectified to convert from AC to DC current. Once properly conditioned, the incoming power is distributed to the installed battery modules 405 for charging by the system controller 460. Outgoing power circuit 450 allows outgoing power exit from the battery modules 405, and be directed to the PCS 430 by the system controller 460. In the PCS 430, the power is conditioned through the transformer to transform voltage/current and is converted from DC to AC via an inverter if necessary. After being conditioned, the power exits the system via the pantograph 420.

Still referring to FIG. 4, in one embodiment, an alternator or a motion type charging system is installed on each train car 470 and integrated into individual mobile battery storage system 400 to convert kinetic energy during train movement (braking and descents) into usable electricity. A DC circuit 475 allows the DC current generated by the RBS 470 be routed to the PCS 430, and enter the existing incoming power circuit 440 to charge the onboard battery modules 405 via distribution by the System Controller 460. This energy is generated from a green source, identified and tracked as such, and sold to the consumer.

Still referring FIG. 4, in one embodiment, a Fire Suppression System (FSS) 480 is integrated into each mobile battery storage system 400 for safety. The FSS is built to remove oxygen from the container of the mobile battery storage system 400 in a fire, or in a fire-containment attempt if a breach of the container has occurred. If the system controller 460 senses an issue, it will send an electrical signal to initiate the FSS. Each battery module 405 is isolated from the others and can be targeted specifically by the FSS. Furthermore, in one embodiment, the train car itself is lined with fire-rated materials for additional safety.

Still referring to FIG. 4, the system controller 460 monitors the state of health of the entire system including initiating the FSS 480 when required, or extending or retracting the pantograph 420 as a way to control charging/discharging. It also manages charging/discharging of the battery modules by conditioning incoming power through the PCS 430, distributing it to the battery modules 405, and controlling charge voltage and current. In another embodiment, the system controller 460 also manages the alternator or a motion type charging system installed on each train car 470 in similar manner as the incoming power. During discharge, the system controller 460 manages discharge current and state of charge from each of the battery packs and modules 405 before routing it through the PCS 430 for distribution to the local power grid. The System Controller further tags and identifies the energy generation source, transmission, and distribution, and, thereby, provides validation and verification of the generation, transmission, and distribution of energy without the need to interface with the larger power transmission grid.

Figure 5:
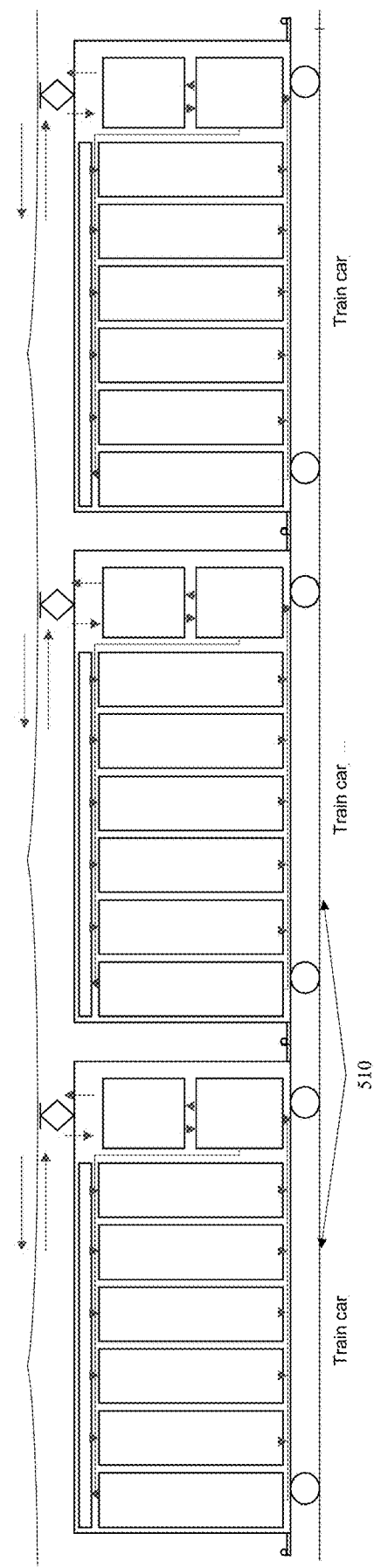
FIG. 5 demonstrates an exemplary assembly of the current invention.

Referring to FIG. 5, an exemplary train 500 of individual train cars 510 of the mobile battery system is depicted to illustrate the practical use of the current invention. Each mobile battery system on each train car can be used stand-alone since each train car is self-contained with all needed functional components. When demanded, they can be linked together to create a Power On Demand (POD) train capable of storing greater amounts of energy. As the POD train travels to and from charging and discharging stations, individual train car can be detached from the POD train to make an on-site power generating facility. In one embodiment, each individual train/system further comprises an external, standard 120V/240V plug as an alternative local power delivery. In another embodiment where a transportainer is used, the mobile battery system can be detached and unloaded from the flat rail car to be positioned on the customer's site, or further transported via other transportation means.

Figure 6:
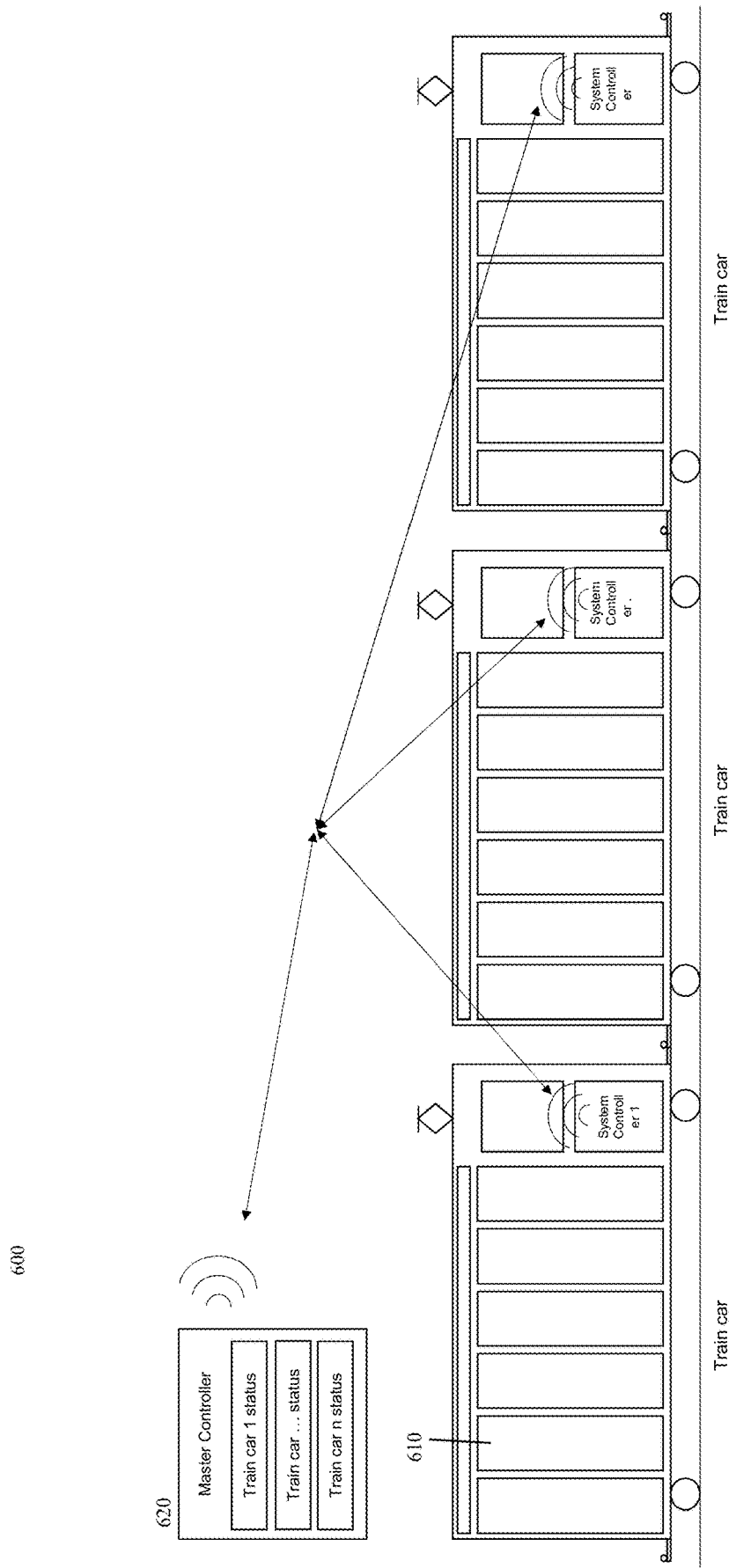
FIG. 6 illustrates an embodiment of the current invention's power and operation management system.

Referring to FIG. 6, an exemplary master control system 600 is depicted. Each train car 610 within the train communicates with the master controller 620. The master controller 620 controls and synchronizes all train cars to charge or discharge in the same manner, monitors overall charge/discharge energy, and sends signals to the system controllers to actuate the pantographs when necessary. It is appreciated that a plurality of communication methods exist even though wireless communication is depicted in FIG. 6. Similarly, a plurality of locations for the master controller can be configured even though off-train location is depicted in FIG. 6.

Figure 7:
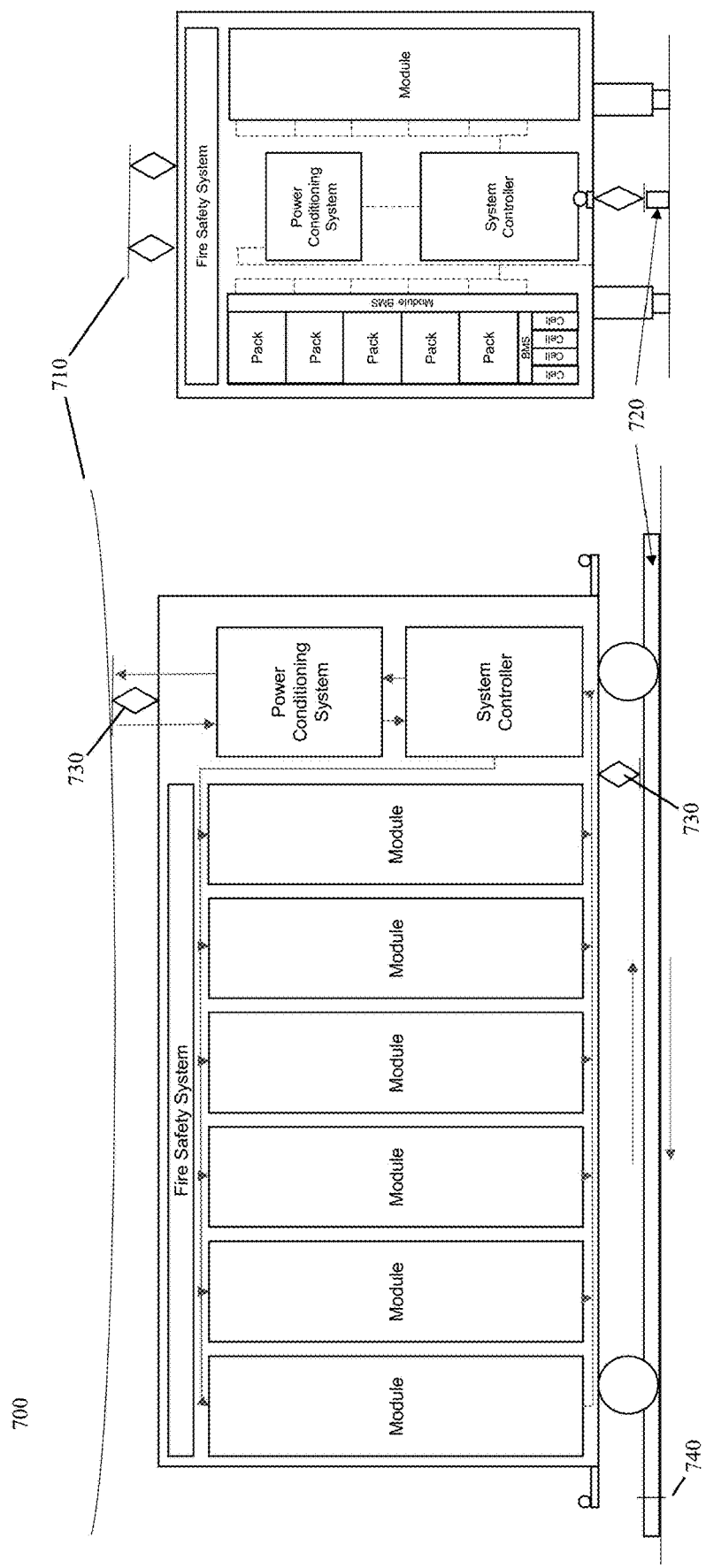
FIG. 7 illustrates an embodiment of the current invention with an alternative electrical conduction system.

Referring to FIG. 7, an exemplary charging and discharging platform 700 at a local power site is depicted. Each platform 700 comprises a site-specific overhead electrical catenary system 710 that receives the mobile battery system's overhead pantograph as foregoing disclosed. In another embodiment, the platform 700 comprises an electrified third rail system 720 instead. Where the mobile battery system to be charged, a step-up transmission substation may be installed on site to transform the source power, e.g. solar, hydro, fossil fuel, etc., to a high voltage, AC current to distribute along the overhead catenary or third rail below to each train car, and its individual battery modules. In one embodiment, the substation further comprises a master cut-off switch. Once the train has entered the charging station, and all train cars are under the overhead catenary or over the electrified third rail system below, the pantograph 730 will be extended to contact the catenary or third rail system. When extended and contact is made, the pantograph acts as a universal plug and the catenary or third rail acts as a universal receiver. The freight rail line will be the ground in the circuit, resulting in incoming electrical power flowing from the catenary/third rail through the pantograph into each battery module. A foregoing disclosed master control system controls the pantographs of the mobile battery system units, i.e., train cars, and can simultaneously extend them, and effectively cause the mobile battery system units be charged in parallel. As each battery module becomes fully charged, the system controller turn off the charging current to that module. As each train car becomes fully charged, the master controller retracts the pantograph of that train car. As to the ground rail lines, they may be isolated by non-conductive segments 740 of the track to isolate the train for safety.

A battery train car of any state of charge may be transported via the existing rail infrastructure between charging and discharging sites. In transit, the energy never interfaces with the traditional grid infrastructure and therefore is not subject to traditional joule-effect power losses. The only loss encountered during transit is the self-discharge of the batteries which is calculated to be more efficient than traditional power grid transmission over most distances.

During discharge, the entire charging process is effectively reversed. The master system controller sends a command via a communication signal to individual train car's system controller to cause a discharge. Each individual system controller then causes the foregoing disclosed pantograph to extend to contact the catenary or third rail system. It also sends a command to foregoing disclosed module, and pack, BMS to switch the module, and battery packs, to a discharging state. As the discharging drains the battery packs and modules, the pack and module BMS's monitor and send real-time information of state of health characteristics to the master system controller, and disconnect any completely drained battery pack from the discharging circuit. Furthermore, before the electricity exits the battery module, and enters the local power grid, the module system controller also commands the foregoing disclosed module PCS to condition the electrical power per customer's specification. The system controller tags and identifies the distribution site for verification and validation purposes.

The invention claimed is:

1. A Power transmission system for transmission of electrical energy comprising a battery unit and a form of transportation to transport said battery unit;
   wherein said transportation is comprised of a plurality of train cars carrying said battery unit and at least one rail track system to which said railcars travel on;
   wherein said battery unit is comprised of plurality of battery modules;
   wherein said battery module is comprised of plurality of battery packs;
   wherein said battery packs is comprised of plurality of battery cells;
   wherein said batter pack is comprised of a battery pack management system;

wherein said battery module is further comprised of a battery module management system.

\* \* \* \* \*